(12) United States Patent
Bedell et al.

(10) Patent No.: US 7,559,048 B1
(45) Date of Patent: Jul. 7, 2009

(54) SYSTEM AND METHOD FOR MANAGING OBJECTS BETWEEN PROJECTS

(75) Inventors: Jeffrey A. Bedell, Arlington, VA (US); Michael Codini, Herndon, VA (US); Arturo Gay, Reston, VA (US); William Hurwood, Washington, DC (US); Benjamin Z. Li, Great Falls, VA (US); Fabrice Martin, Washington, DC (US); Ramkumar Ramachandran, Reston, VA (US); Steven S. Trundle, Falls Church, VA (US); Abhimanyu Warikoo, New York, NY (US); Kyle N. Yost, Washington, DC (US)

(73) Assignee: Microstrategy Incorporated, McLean, VA (US)

( * ) Notice: Subject to any disclaimer, the term of this patent is extended or adjusted under 35 U.S.C. 154(b) by 1779 days.

(21) Appl. No.: 09/883,508

(22) Filed: Jun. 19, 2001

(51) Int. Cl.
  *G06F 9/44* (2006.01)
(52) U.S. Cl. ............ 717/101; 717/100; 717/120; 717/122
(58) Field of Classification Search ........ 717/100, 717/101, 120, 122; 719/310
  See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,854,932 A * | 12/1998 | Mariani et al. | 717/116 |
| 5,864,856 A | 1/1999 | Young | |
| 5,890,167 A | 3/1999 | Bridge | |
| 5,914,878 A | 6/1999 | Yamamoto | |
| 6,112,024 A * | 8/2000 | Almond et al. | 717/122 |
| 6,154,766 A | 11/2000 | Yost | |
| 6,167,563 A * | 12/2000 | Fontana et al. | 717/107 |
| 6,247,008 B1 | 6/2001 | Cambot | |
| 6,279,033 B1 | 8/2001 | Selvarajan | |
| 6,385,768 B1 * | 5/2002 | Ziebell | 717/121 |
| 6,487,713 B1 * | 11/2002 | Cohen et al. | 717/105 |

OTHER PUBLICATIONS

MicroStrategy Announces DSS Agent 5.1, Industry's Leading ROLAP Interface Extends its Reporting Functionality, provides Performance Enhancements & Offers Support for Informatica's PowerMart, Dec. 8, 1997.

(Continued)

*Primary Examiner*—Li B Zhen
(74) *Attorney, Agent, or Firm*—Hunton & Williams LLP

(57) ABSTRACT

A system and method for manipulating objects between related projects. Dependencies between object are checked as objects are moved between projects. The dependency review enables all dependent object to be copied simultaneously. The system and method facilitates the management of multiple stages of a project by permitting as object and all of its modified dependents to be easily copied from one stage to another.

5 Claims, 5 Drawing Sheets

OTHER PUBLICATIONS

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add-In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.

* cited by examiner

SYSTEM AND METHOD FOR MANAGING OBJECTS BETWEEN PROJECTS

FIELD OF THE INVENTION

This invention relates to an application system and method that enables program objects to be moved, copied, and otherwise manipulated between related program projects.

BACKGROUND OF THE INVENTION

Programming computer systems and networks to perform complex tasks is frequently accomplished through the creation and integration of component objects. Such component objects are useful for accomplishing particular tasks and thus may be replicated and used whenever performance of the particular task is needed. The component objects are also useful in that they may be combined to form more complex component objects. A complex task requires the completion of many more basic tasks. Accordingly, a component object to perform a complex task may be formed from many component objects that perform more basic tasks. A user arranging and combining more complex component objects is frequently unaware of the more basic component objects that form the more complex component objects.

When creating a project to accomplish a particular task it is desirable for the project to go through several stages such as development, testing, and final production. Changes to component objects and the relationships between objects may occur during such stages as development and testing. When propagating a change from one stage to another it becomes critical to track all changes that have been made to all component objects.

SUMMARY OF THE INVENTION

Accordingly, the present invention provides an application system that is used in managing objects between different stages of a project. The application system checks the dependencies between objects as they are moved from one stage to another. The application system allows a user to move or copy an object or group of objects from a project in a certain stage to the next stage. The application also allows users to manage objects within the same project and within other related projects.

The present invention is particularly useful within complex decision support systems, reporting systems, business intelligence systems and on-line analytical processing (OLAP) systems that efficiently retrieve useful information from data warehouses. Data warehouses typically allow users to tap into a business's vast store of operational data to track and respond to business trends that facilitate forecasting and planning efforts. A decision support system incorporating the present invention creates and maintains data about the store of operational data, about the system itself, about the user and about the information desired to be retrieved. These created data are organized into system objects. These system objects are used and manipulated to extract and format information that is particularly useful to a particular user. The decision support system includes objects that define and describe the particular store of operational data such as attributes, facts, hierarchies, transformations, partitions, tables and functions. System objects may also be related to the configuration of the system and thus define users, user groups, database instances, schedules, etc. System objects that are likely to be directly manipulated by a user include reports, documents, prompts, filters, templates, metrics, custom groups, consolidations, searches, etc. Other system objects perform other tasks at the various operational levels of the decision support system.

The system objects in the decision support system incorporating the invention may include or be included in other system objects. The system objects may also include more basic objects that are not system objects. These basic objects may or may not be unique to the decision support system. The system objects share certain common attributes. In particular, system objects include specific object information. This stored object information includes one or more of a unique identifier, a version identifier, and other information regarding the system object. The stored object information for each system object also includes references to other system objects on which it depends.

The application system of the present invention uses the stored object information to allow users to efficiently develop projects by creating, modifying, and combining system objects in a manner that results in the presentation and extraction of useful information from a vast store of operation data. The user may create related projects that accomplish similar tasks by using similar system objects. For example, the user may create related projects for different stages of development such as initial development, testing, and final production. These related projects are created by duplicating one project. Thus the object information regarding the system objects in each related project is similar. In particular, the unique object identifiers, the version identifiers, and system object dependencies are initially the same. This allows objects to be copied from one of the related projects to another without changing references to dependent system objects. As new and modified objects or groups of objects are deemed successful at one stage, they may be copied to the next stage with the application system and method of the present invention.

The application system of the present invention provides a system in which a user manages the objects in related projects. When the user requests that new or modified system objects be copied from a source project to a destination project, the application system collects the identification of any dependent system objects. The application system compares the unique identifier of the dependent system objects in the source project to the system objects in the destination project. Based on this comparison, the application system ensures that new or modified system objects are updated in the destination project. The dependent objects of modified dependent objects are also included in the comparison in a cascading manner that may result in the update of many more objects than would be efficient for a user to track and copy individually. The system application may rely on user input to determine which objects should be copied. This permits objects that may be required to be different in related projects to be maintained in different versions.

The system application provides a means for a user to copy system objects from one related project to another while maintaining the desired relationships between the objects that were present in the source project. This allows the user to maintain a development project, a testing project and a production project that are each operational. Each project may operate on data of different levels of complexity. The user may develop features and modify or add system objects to a development stage, while testing other features on more complex databases, while a operational version of the project is being used on real operational data to produce useful information.

DETAILED DESCRIPTION OF PREFERRED EMBODIMENTS

The present invention may be used in many contexts including reporting systems, decision support systems, business intelligence systems and OLAP systems. A particular embodiment of such a system for use of the present invention is provided below.

Figure 1:
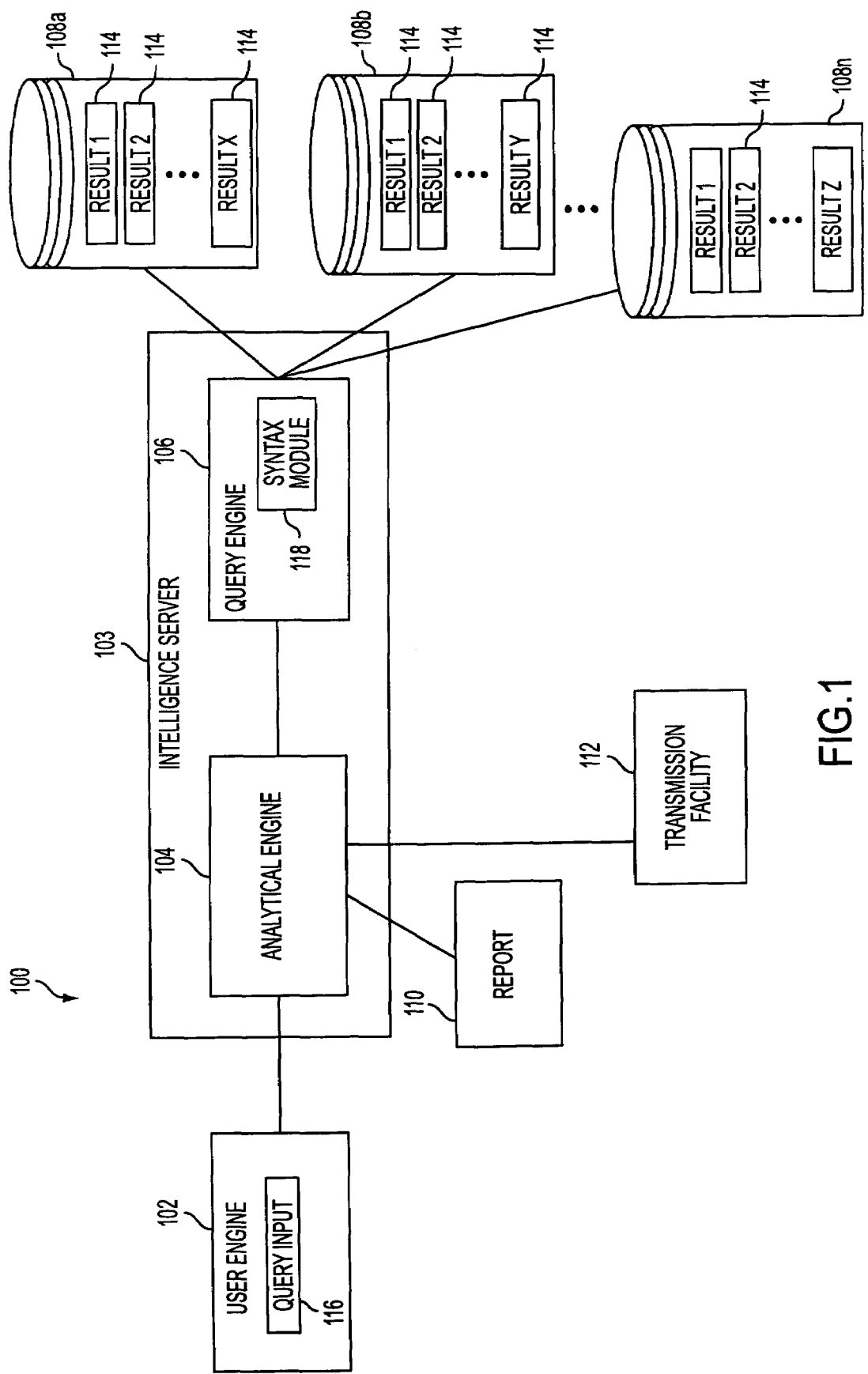
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1 M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
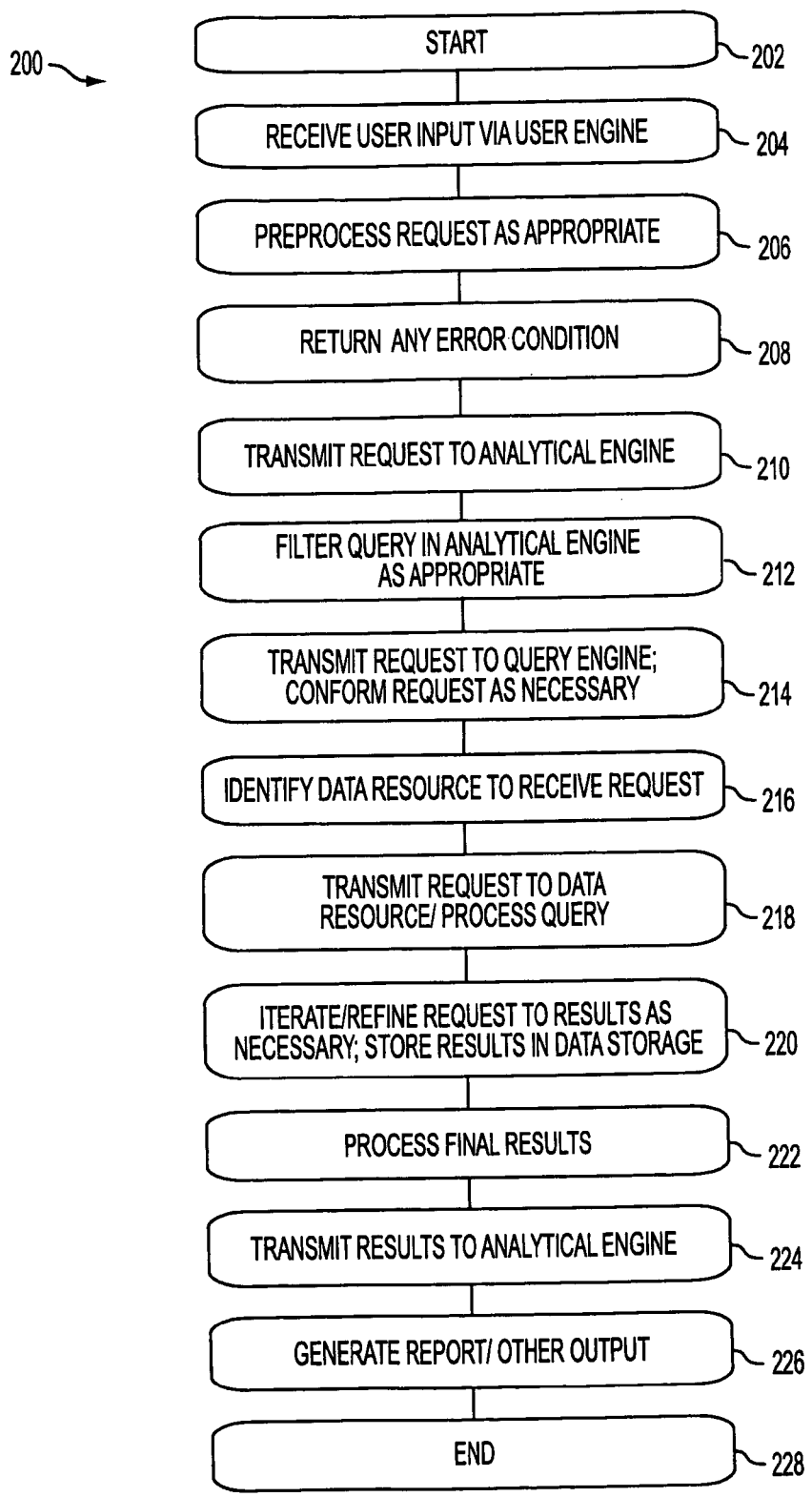
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

The access of data resources as described above relies on various modules, reports, documents, prompts, filters, templates, metrics, custom groups, consolidations, searches, attributes, facts, hierarchies, transformations, partitions, tables, functions, users, database instances, schedules, etc. These data are distinct from the data resources that are hosted and accessed by the system. These data that are created, stored, and used by the system during its operation are referred to as metadata. Each engine in the system may use the metadata as required to complete the processes initiated by the user input. Effective manipulation of the metadata allows the effective creation of queries, reports, requests and other routines and actions that may be useful for each particular user.

As noted above the various user engines, analytical engines, and query engines may include or interface to or be supported by one or more associated servers that may operate in various different environments. The various engines and modules may be located in different places that have different customs. To accommodate these differences, the metadata is stored in a neutral representation and is converted to a form required by an environment or a locale as it is accessed. In particular, the metadata includes many numbers, dates, and times whose representation varies depending on customs of the viewer, which are typically based on the viewer's location. For example the text string "1,000" is used in US-English to represent the integer 1000. In German the same string represents the floating-point number 1 to four significant digits. Similarly the text string "11/7/1999" represents the 11 Jul. 1999 in British English, but 7 Nov. 1999 in US-English. The neutral form for numbers may be a binary representation and for dates may be a MsiDateTime class. When the presentation form of the metadata varies, the metadata is converted to the proper form from the neutral form before it is displayed. The conversion relies on determining the locale of the user. When the metadata is accessed by a desktop GUI, the system defaults of the desktop system may used to determine the proper form of the metadata. When the metadata is accessed through a web browser the ASP reads off the web browser's locale when a user logs on, and includes it as a parameter of its create session method. Whenever an engine calls an XML generation component on behalf of some user, it uses the XML process context to pass in the locale for generating the XML. The XML generation routines automatically format all numbers and dates into strings in the XML, using the standard conversion functions. The XML context supplies the required locale. XML parsing routines also use the supplied locale when reading in numbers and dates. Some numbers and dates may be passed as strings, and then translated, rather than relying on the XML parser to do the conversion.

The metadata is organized into various system objects with some common attributes. System objects are particular routines, applications, data sets, filters, modules, etc. that are manipulated by the user and the user engine, analytical engine, and query engine to efficiently extract useful information from the base data resources. These system objects may be grouped into projects designed by or for a particular user of the network architecture to accomplish particular goals. The network architecture is designed to allow the flexible use of these system objects to perform a wide variety of functions on the base data resources to provide information in many useful formats. The development of the specific objects in specific projects allows successful extraction of information from the base data resources.

Figure 3:
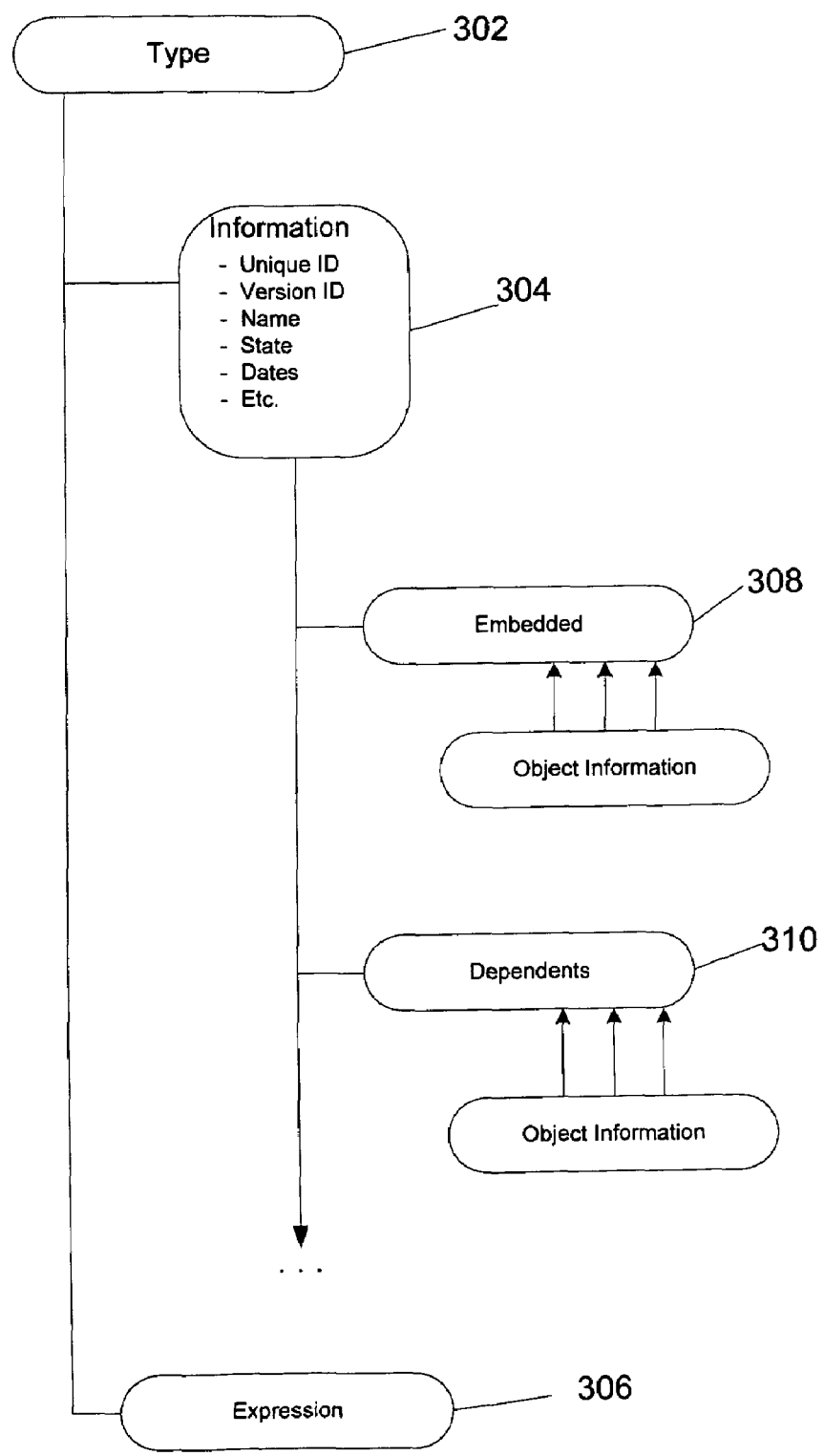
FIG. 3 is a map of an object manipulated according to an embodiment of the invention.

A map of a representative system object is shown in FIG. 3. System objects may be further divided into objects. However not all such objects are system objects. System objects start with a type-specific interface 302 that has the name of the type of the object. System objects include an information object 304. The system object definition or expression 306 includes information that is specific to the particular type of system object. Information object 304 includes properties that are common to system objects. These properties include one or more of a unique identifier, a version identifier, state, dates, comments, and other properties. The information object 304 also includes embedded object information 308 that provides information on other system objects that contain or refer to this object. The information object 304 also includes dependents information that lists the system objects that appear in this system objects definition or expression.

The term dependent is used in a manner similar to subordinate. A system object is a dependent object of another system object when the other system object incorporates or otherwise calls the dependent object. This usage does not require that the dependent object rely on the other object for operation. To the contrary, the other object typically relies on its dependent objects for operation. Thus a system object typically requires the presence of its dependent objects for operation. Furthermore, dependent objects may recursively have their own dependent objects. Thus a system object may refer to another system object indirectly through one or more intermediate system objects. Herein the term "dependent objects" is used to name any system object to which another system object refers whether directly or indirectly.

Related system objects may be grouped into folders. When the system objects work together to accomplish particular tasks, the folders may represent particular projects. The retention of the specific references to dependent system objects is useful for updating or adding system objects to a project. When adding a new or modified object to a project, all of its dependent objects should be present in a form recognized by the added system object. The system object remains complete when its dependent system objects are in the same project in a compatible form. Typically this means that at the same time that a system object is added to a project, the latest version of each dependent system object that has been modified must also be added to project.

Projects typically go through several stages before they are considered finished. Each stage has its own project. For instance, there may be a development stage in which the system objects are created for the first time. There may be testing stage where the objects are tested and final production stage where the actual project is accomplished by acting on actual operational data of a business. In a particular embodiment of this invention an application system assists in the creation of parallel copies of projects for use as different stages and in the manipulation of system objects from one project to other related projects.

Figure 4:
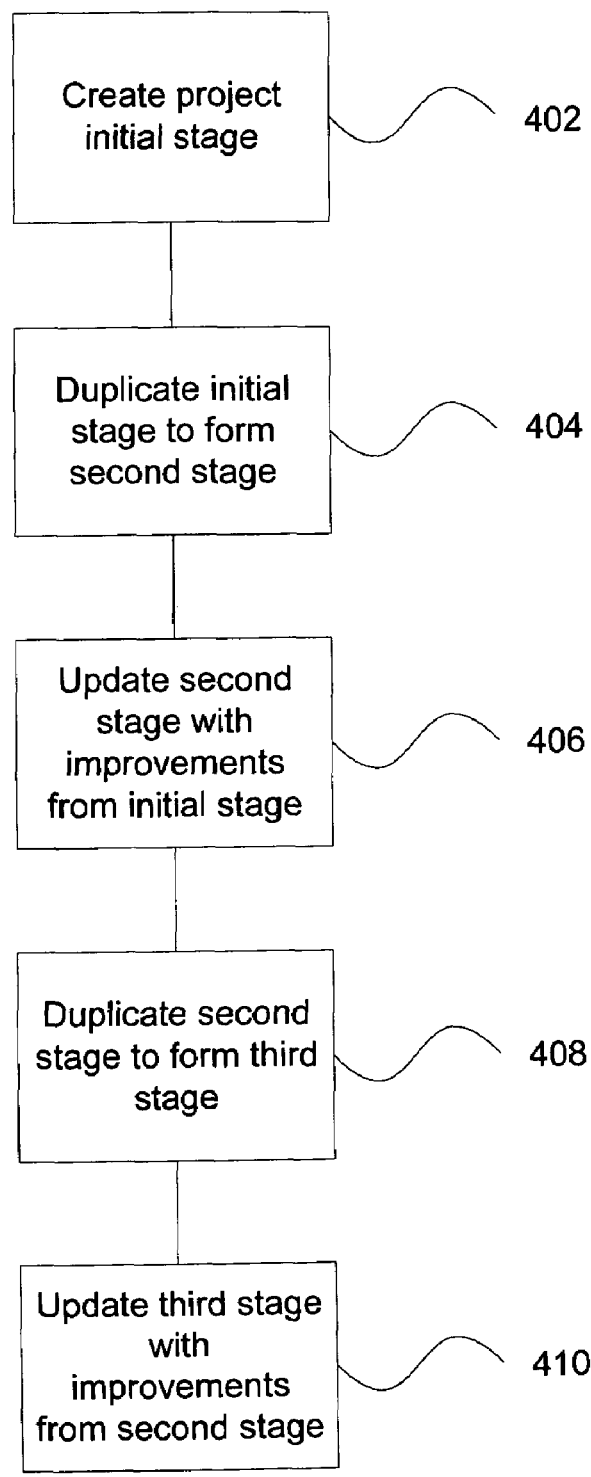
FIG. 4 is a flowchart illustrating the development of projects of objects manipulated according to an embodiment of the invention.

The typical steps in a method conducted with the application system of this embodiment are shown in FIG. 4. In step 402, a project is created. The project may include various system objects that facilitate a user in extracting useful information from the stored base data. The various system objects that the user explicitly includes in the project likely have various dependent system objects. As previously described, many dependent system will recursively have their own dependent system objects. Accordingly, the number of system objects in a project may appear unmanageable, even though the user may only explicitly use a limited number of system objects. In step 404, the project is duplicated to create a second stage. The duplication of step 404 duplicates each of the system objects that are present in the project of the initial stage. Thus, the system objects in the second stage project have the same system object identifiers, the same embedded object information, and the same dependents information as the objects in the initial stage project. The relationships between the various objects are thus maintained in the two projects. There may be times when all the relationships may not be desired to be maintained exactly. For instance, the two projects may operate on different base data resources. In this instance some editing of the system objects may be required to correctly refer to the differing base data resources. The result of step 402 is two separate projects that may be treated independently, but that maintain similar relationships between objects and have a similar function. These two projects are particularly useful for conducting different stages of development.

After a system object, or modification to a system object, has been successfully implemented in a stage, it is typically desired to transfer the new or modified system object from one stage to another. The application system of the present invention facilitates the copying of system objects from one project to another related project. This updating of system objects is show in step 406 of FIG. 4. The duplication of system objects is facilitated by step 404 in that the system objects in each stage have similar identifiers and references to other dependent system objects. It is, however, important that the references for each modified system object to be updated during the copying process. Managing the cascading updates that are required by copying a system object from one project to another is accomplished through the use of the application system of an embodiment of the present invention. As discussed above, the dependencies between system objects are recorded. The system application checks these dependencies and facilitates the updating of all the changes that cascade through the system object dependencies. The application system compares the system object identifiers and version identifiers to determine which system object may warrant modification.

If there are more than two stages, then steps 404 and 406 are essentially repeated to form further projects at different stages. In FIG. 4, a third stage is created in step 408. The third stage is updated in step 410. It should be understood that steps 406 and 410 might occur repeatedly at anytime after the particular project that is updated has been created. Step 406 occurs repeatedly after step 404. Step 410 occurs repeatedly after step 408. However, step 408 may occur before occurrences of step 406. It should also be understood that the system application of this to embodiment may be used to copy system objects from any project to another as long as the source and the destination projects use similar system object identifiers. For example, different users may be provided different projects to use. The projects for different users may have minor functional differences and, accordingly, minor differences in the included system objects. Related projects include similar object identifiers since one project is copy of the other or, possibly, a copy of a copy of another. Thus, it should be understood that step 408 can be accomplished by duplicating the initial stage. Steps 404 and 408 may be performed before steps 406 and 410 by duplicating the initial stage twice.

Figure 5:
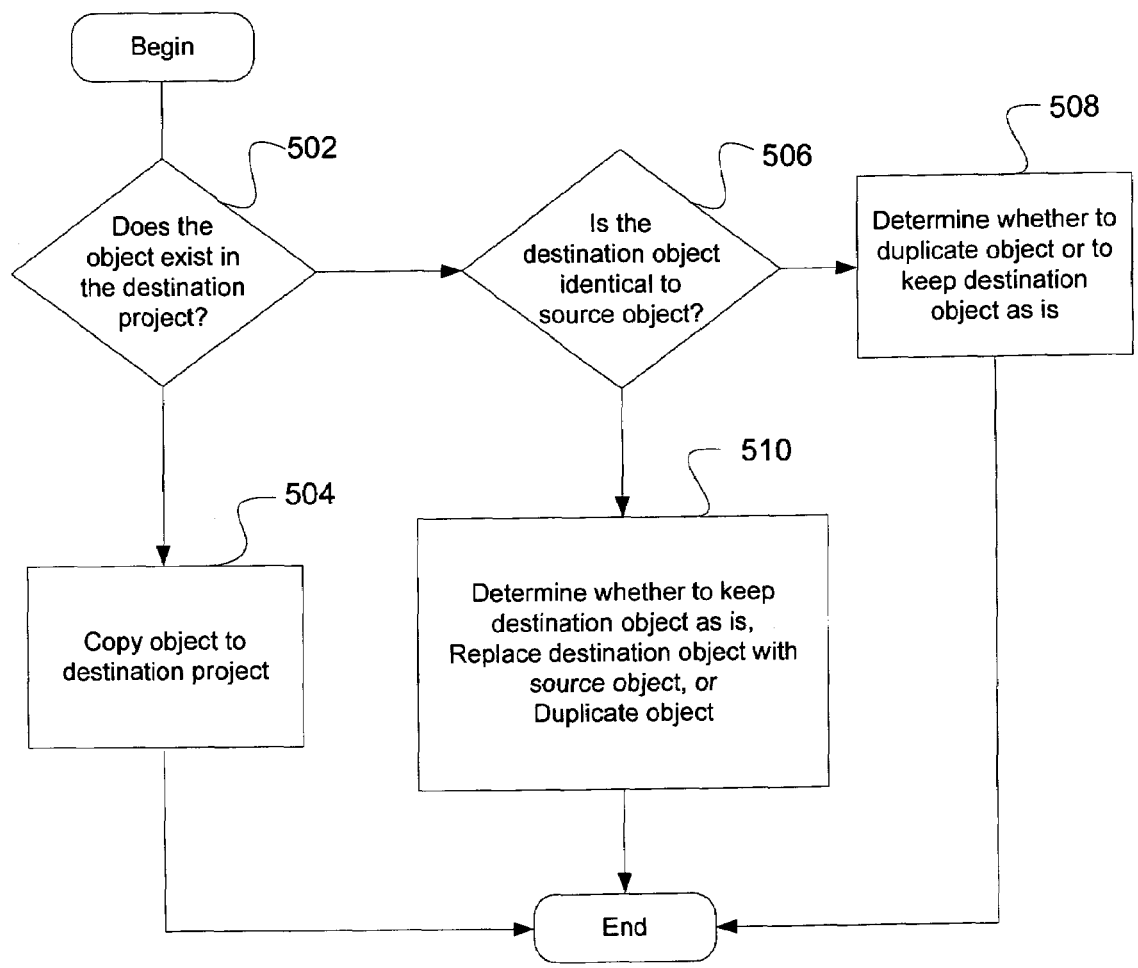
FIG. 5 is a flowchart illustrating the steps preformed to copy an object from a source project to a destination project according to an embodiment of the invention.

FIG. 5 shows the general method the system application uses to copy an object from a source project to a destination project. In step 502, the system application, when copying an object from a source project to a destination project, first determines if the object exists in the destination project. If the object does not exist in the destination project, the system application copies the object to the destination project as shown in step 504. If the object does exist in the destination project, as shown in step 506, the system application compares the object in the source project with the object in the destination object. Two system objects are considered identical when they have the same unique identifier, when they have the same version identifier, and when their state property indicates that there is no modification to either object since the last time its version identifier was updated. If the source object and the destination object are identical, the system application determines whether to duplicate the object in the destination project or whether to take no action and keep the destination object as is, as shown in step 508. This determination typically is accomplished by prompting the user to input the desired result, although the system application may include specific routines to make the determination in particular situations. A duplicate object will be assigned a new unique identifier and a new version identifier. The new name of the duplicate object may be selected by the user or generated by the system application. In step 510, if the destination object is not identical to the source object, then the system application determines whether to keep the destination object as it is (not include the source object in the destination project), replace the destination object with the source object, or duplicate the object as described in conjunction with step 508. Again this determination is typically made by prompting the user. The determination may be based on whether the source object is newer or older than the destination object by comparing dates in the object information.

Typically a system object that is copied from one project to another contains references to other objects. The system application examines each of these dependencies. For each object referenced by an object that is copied to a destination project, the system application proceeds according to FIG. 5 to determine whether and in what manner to copy the dependent objects. However, when dealing with dependent objects the system application generally does not determine to duplicate the object in any of steps 504, 508, or 510. Accordingly, the user may not be prompted with the option to duplicate dependent objects. In the preferred embodiment, the system application examines all the recursive dependencies of the object the user selects to be copied. The system application then acts to copy, where required, all the dependents of an object to the destination project prior to copying the selected object. This sequence results in each object being present in a project before another object may refer to it.

The system application communicates with a server or servers that control the storage of the metadata. These servers may or may not operate in the same environment. The system application is a program that includes a user interface, typically a graphical user interface. The program also includes an operational module that is capable of processing the system objects as described herein. The operational module is capable of interfacing with the various environments in which the metadata may reside and converting the metadata into a form compatible in one environment to a form compatible in another environment. The system application may reside on a machine-readable medium for sale and distribution.

Other embodiments and uses of the invention will be apparent to those skilled in the art from consideration of the specification and practice of the invention disclosed herein. The disclosure and examples should be considered exemplary only.

What is claimed is:

1. A computer implemented method for managing groups of objects for use in a reporting system project comprising the steps of:

receiving a command to perform a selected function on a selected object;

automatically identifying dependent objects referred to by the selected object;

determining using a computer processor an appropriate manner of executing the selected function on the selected object;

determining using a computer processor appropriate functions to be performed on the dependent objects;

automatically causing the appropriate functions to be performed on the dependent objects;

automatically causing the execution of the selected function on the selected object in the appropriate manner;

wherein objects are grouped in projects and the selected function relates to manipulating objects within and between projects and wherein within each project each object has a unique identifier and a version identifier; and wherein the step of receiving is a step of receiving a command to copy a selected object from a source project to a destination project.

2. The method of claim 1 wherein the unique identifier and version identifier of objects in the source project are similar to the unique identifier and version identifier of objects in the destination project.

3. The method of claim 1 wherein the step of determining an appropriate manner of executing the function includes the steps of:

determining, by comparing unique identifiers and version identifiers, whether the selected object exists in the destination project in an identical form and whether the selected object exists in the destination project in a modified form; and selecting whether to copy the selected object from the source project to the destination project, to replace an object in the destination project with the selected object, and to keep an object in the destination project as is.

4. The method of claim 3 wherein the step of selecting includes prompting the user for a selection.

5. A system application stored on a computer-readable storage medium for managing objects within and between projects of a reporting system, the objects including unique identifiers and version identifiers that are similar between projects, the system application comprising:

a user interface for receiving a user command to manipulate a selected object;

an operational module interfacing with the projects for identifying dependent objects referred to by the selected object, determining an appropriate manner of executing the user command, determining appropriate functions to be performed on the dependent objects, performing the appropriate functions on dependent objects, and executing the user command in the appropriate manner;

wherein the operational module, upon receiving a user command to copy the selected object from a source project to a destination project, determines, by comparing the unique identifiers and the version identifiers, whether the selected object exists in the destination project in an identical form and whether the selected object exists in the destination project in a modified form; and wherein the operational module communicates with the user interface to select whether to copy the selected object from the source project to the destination project, to replace an object in the destination object with the selected object, and to keep an object in the destination project as is.

* * * * *